United States Patent
Jiang et al.

(10) Patent No.: US 7,681,210 B2
(45) Date of Patent: Mar. 16, 2010

(54) EJECTION APPARATUS FOR DATA STORAGE DEVICE

(75) Inventors: Xiao-Gang Jiang, Shenzhen (CN); Hung-Chun Lu, Tu-Cheng (TW); Wen-Kang Lo, Tu-Cheng (TW); Chien-Li Tsai, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 779 days.

(21) Appl. No.: 11/501,615

(22) Filed: Aug. 9, 2006

(65) Prior Publication Data
US 2007/0035922 A1 Feb. 15, 2007

(30) Foreign Application Priority Data
Aug. 10, 2005 (CN) .................. 2005 2 0063041 U

(51) Int. Cl.
*G11B 17/04* (2006.01)
*G06F 1/16* (2006.01)
(52) U.S. Cl. .................. 720/638; 720/653; 361/679.38
(58) Field of Classification Search ......... 720/636–638, 720/653; 361/679.38, 679.39, 679.58, 679.33
See application file for complete search history.

(56) References Cited

U.S. PATENT DOCUMENTS

| | | | | |
|---|---|---|---|---|
| 5,021,904 A * | 6/1991 | Shimizu et al. | ......... | 360/96.51 |
| 5,319,519 A * | 6/1994 | Sheppard et al. | ....... | 361/679.39 |
| 5,504,648 A * | 4/1996 | Honda et al. | ........... | 361/679.43 |
| 5,684,655 A * | 11/1997 | Fujimura | ................. | 360/97.01 |
| 5,764,478 A * | 6/1998 | Ohgami et al. | ......... | 361/679.09 |
| 5,825,616 A * | 10/1998 | Howell et al. | .......... | 361/679.38 |
| 5,831,820 A * | 11/1998 | Huang | ................... | 361/679.38 |
| 6,015,308 A * | 1/2000 | Lee et al. | ..................... | 439/155 |
| 6,185,103 B1 | 2/2001 | Yamada | | |
| 6,216,195 B1 * | 4/2001 | Lee et al. | ..................... | 710/303 |
| 6,351,379 B1 * | 2/2002 | Cheng | ................... | 361/679.33 |
| 6,519,160 B1 * | 2/2003 | Branch et al. | ............... | 361/754 |
| 6,538,972 B1 * | 3/2003 | Poulsen | ...................... | 720/638 |
| 6,654,239 B2 * | 11/2003 | Smith | ................... | 361/679.38 |
| 6,992,897 B2 * | 1/2006 | Shimada et al. | ............. | 361/726 |

(Continued)

FOREIGN PATENT DOCUMENTS

TW          M221956          10/2004

*Primary Examiner*—William J Klimowicz
(74) *Attorney, Agent, or Firm*—Zhigang Ma

(57) ABSTRACT

An exemplary ejection apparatus is provided for ejecting a data storage device out of a chassis. The ejection apparatus includes a pair of driving members, a connecting member, and an operating member. The operating member is slidably attached to the chassis and the connecting member. The connecting member includes a pair of second steps. The driving members are pivotably crossed together and attached to the chassis. Each of the driving members includes a driving portion with a slanting wall formed at one free end thereof, and a first step formed at the other end thereof slidably engaging with the corresponding second step. The operating member moves the connecting member to urge a scissoring movement of the driving member, with the first steps slidably engaging with the second steps. The driving portions push the data storage device out of the chassis.

16 Claims, 7 Drawing Sheets

U.S. PATENT DOCUMENTS

| | | |
|---|---|---|
| 7,009,836 B2 | 3/2006 | Lo |
| 7,019,965 B2 * | 3/2006 | Bradley et al. ......... 361/679.38 |
| 2003/0103327 A1 * | 6/2003 | Chien ........................ 361/686 |
| 2003/0112597 A1 * | 6/2003 | Smith ........................ 361/685 |
| 2004/0095718 A1 * | 5/2004 | Salinas et al. ............... 361/685 |
| 2005/0111178 A1 * | 5/2005 | Bradley et al. .............. 361/684 |
| 2006/0291159 A1 * | 12/2006 | Jiang et al. .................. 361/685 |

* cited by examiner

EJECTION APPARATUS FOR DATA STORAGE DEVICE

CROSS-REFERENCES TO RELATED APPLICATION

Related subject matter is disclosed in three co-pending U.S. Patent Applications entitled "PUSHING APPARATUS FOR DATA STORAGE DEVICE" with application Ser. Nos. 11/472,978, 11/487,560 and 11/452,536 and assigned to the same assignee with this application.

BACKGROUND OF THE INVENTION

1. Field of the Invention

The present invention relates to ejection apparatuses for data storage devices, and particularly to a ejection apparatus for readily ejecting a data storage device out of a computer chassis.

2. General Background

The production of notebook computers has matured and entered a meager profit era. Only cost down and bringing convenience to users can competitiveness. Typically, data storage devices, such as hard disk drives (HDDs), and compact disk-read only memory (CD-ROM) drives, are attached to a bottom panel of a notebook computer chassis. A connecter of a data storage device connects with a connecter of a motherboard in the notebook computer to exchange data. However, because the interior space of the notebook computer chassis is very limited, some elements adjacent the data storage device must be detached in order to achieve operating space for pulling out the connecter of the data storage device from the connecter of the motherboard. The process of detaching a data storage device is very inconvenient.

What is needed is an ejection apparatus for readily ejecting a data storage device out of a computer chassis.

SUMMARY

In one preferred embodiment, an ejection apparatus is provided for ejecting a data storage device out of a chassis. The ejection apparatus includes a pair of driving members, a connecting member, and an operating member. The operating member is slidably attached to the chassis and the connecting member. The connecting member includes a pair of second steps. The driving members are pivotably crossed together and attached to the chassis. Each of the driving members includes a driving portion with a slanting wall formed at one free end thereof, and a first step formed at the other end thereof slidably engaging with the corresponding second step. The operating member moves the connecting member to urge a scissoring movement of the driving members, with the first steps slidably engaging with the second steps. The driving portions push the data storage device out of the chassis.

Other advantages and novel features will become more apparent from the following detailed description when taken in conjunction with the accompanying drawings, in which:

DETAILED DESCRIPTION OF THE EMBODIMENTS

Figure 1:
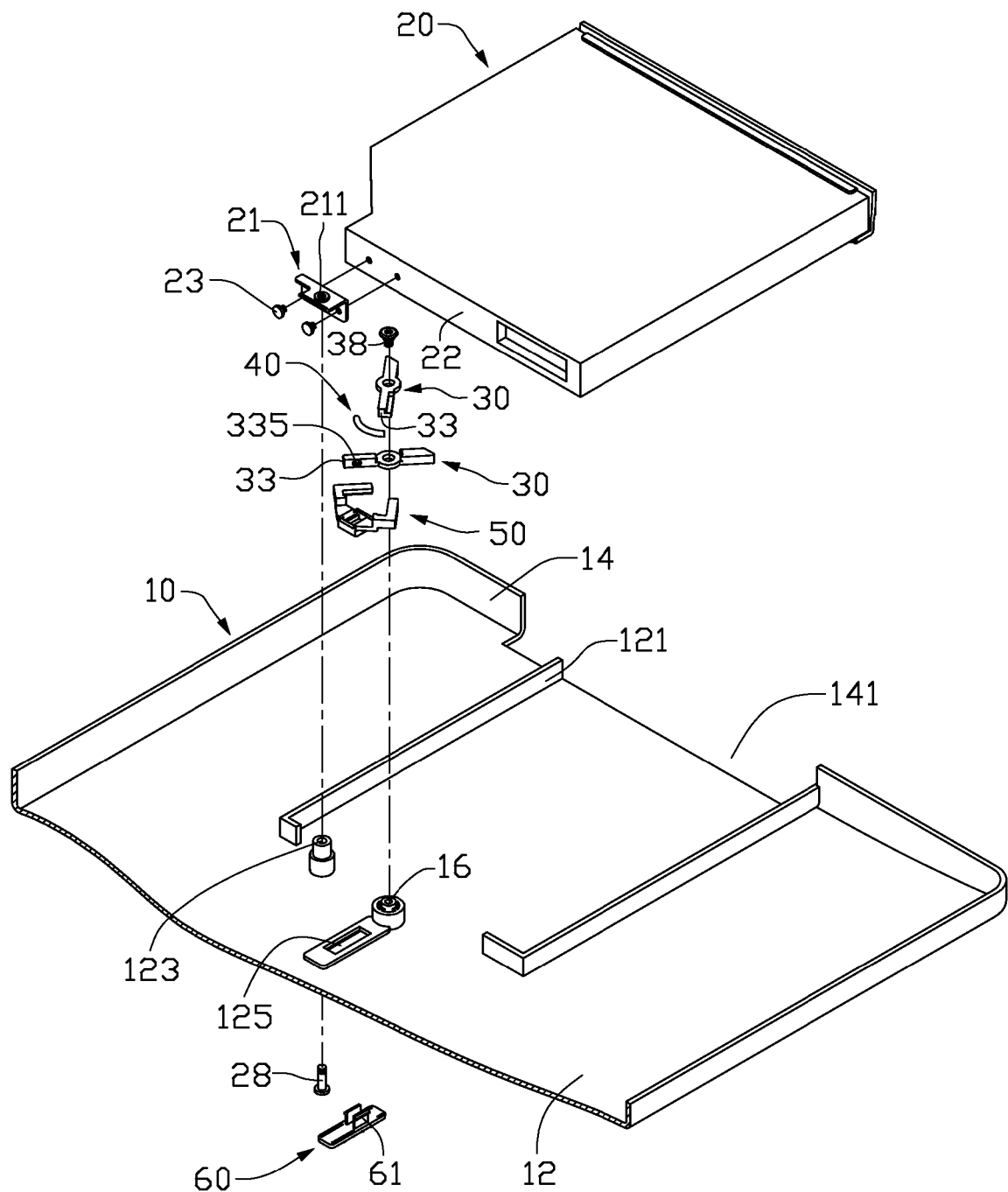
FIG. 1 is an exploded, isometric view of an ejection apparatus in accordance with a first preferred embodiment of the present invention, with a data storage device, and a chassis, the ejection apparatus including a pair of driving members, and a connecting member.

Referring to FIG. 1, an ejection apparatus in accordance with a first preferred embodiment of the present invention is provided to push an electronic component out of a chassis 10 of an electronic device like a notebook computer. The component is a data storage device 20 in this preferred embodiment. The ejection apparatus includes a pair of driving members 30 pivotably attached crosswise to each other much like a pair of scissors, with a resilient member 40 disposed therebetween, an operating member 60 slidably attached to the chassis 10, and a connecting member 50 movable together with the operating member 60 to urge a scissoring movement of the driving members 30.

The data storage device 20 includes a fixing plate 21 attached to a rear wall 22 thereof by some conventional fasteners 23, such as screws. The fixing plate 21 includes a threaded hole 211 defined therein.

The chassis 10 includes a bottom panel 12, and a side panel 14. An opening 141 is defined in the side panel 14 for entry of the data storage device 20. A pair of spaced sliding rails 121 extends from the bottom panel 12, cooperatively defining a railway for the data storage device 20 sliding into or out of the notebook computer chassis 10. A first protruding seat 123 and a second protruding seat 16 extend from the bottom panel 12, near and toward a rear end of the rails 121. The first protruding seat 123 includes a through hole defined therein, for a screw 28 extending therethrough to engage in the threaded hole 211 of the fixing plate 21 of the data storage device 20. The second protruding seat 16 includes a threaded hole defined therein, for engaging a fastener 38 therein. A channel 125 is defined in the bottom panel 12 beside the second protruding seat 16, aligning with the rails 121 away from the side panel 14.

Figure 2:
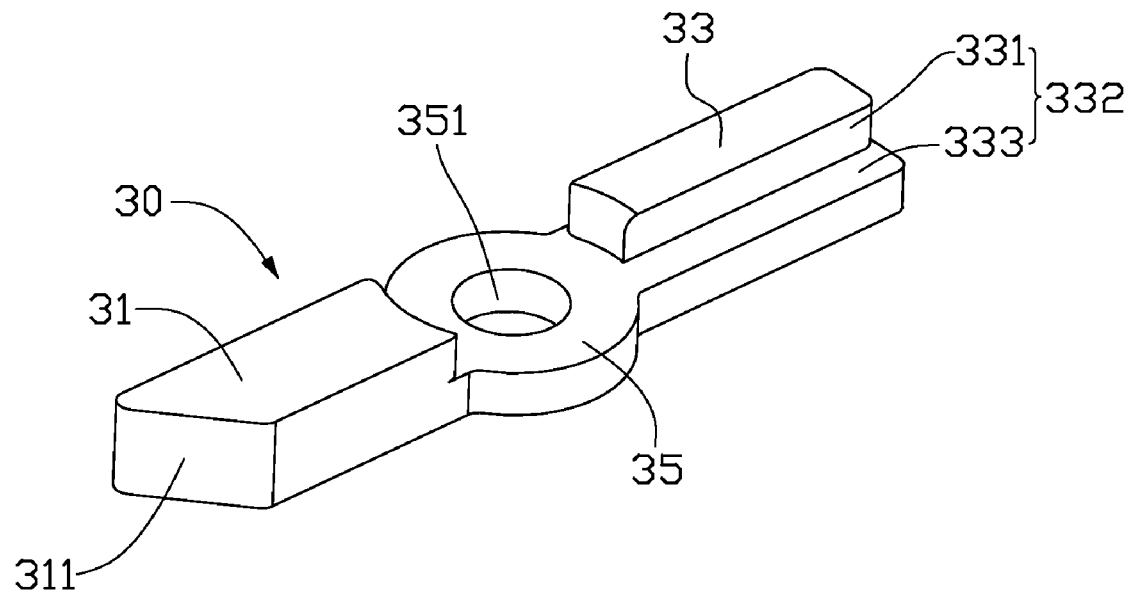
FIG. 2 is an enlarged, isometric view of the connecting member of FIG. 1, but viewed from another aspect respectively.

Referring to FIG. 2, each of the driving members 30 includes a center portion 35 defining a center hole 351 therein, and a pair of aligned arms 31, 33 extending from opposite sides of the center portion 35 respectively. Each of the arms 31 includes a driving portion 311 with a slanting wall formed at a free end thereof. Each of the arms 33 includes a first step 332 formed in a sidewall thereof. Each of the first steps 332 includes a first wall 331, and a second wall 333 perpendicular to the first wall 331. An aperture 335 (see FIG. 1) is defined in each of the arms 33, for holding one end of the resilient member 40 therein. In the first preferred embodiment, the resilient element 40 is an arc-shaped metal strip.

Figure 3:
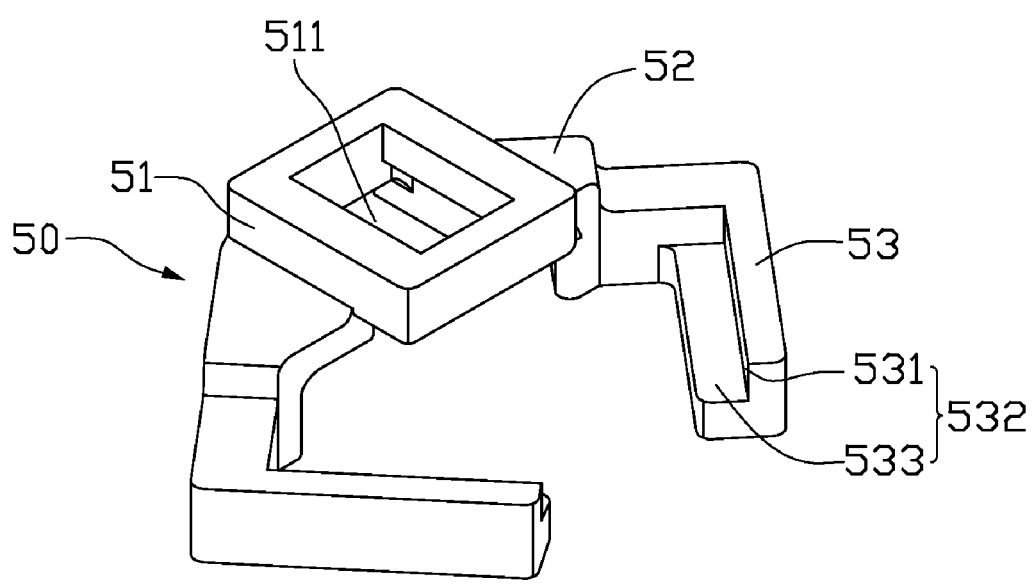
FIG. 3 is an enlarged, isometric view of one of the driving members of FIG. 1, but viewed from another aspect respectively.

Referring to FIG. 3, the connecting member 50 includes a bracket 52, and a hollow frame 51 crossed over a corner of the bracket 52. The frame 51 defines a slot 511 therein extending through the bracket 52. The bracket 52 includes a pair of angular jaws 53. Each of the jaws 53 includes a second step 532 formed in an inside surface thereof, for slidably engaging with the corresponding first step 332 of the driving member 30. Each of the second steps 532 includes a first wall 531, and a second wall 533 perpendicular to the first wall 531.

The operating member 60 includes a pair of hooks 61 perpendicularly extending from an inside surface thereof, and a manipulating portion 63 formed from an outer surface thereof.

Figure 4:
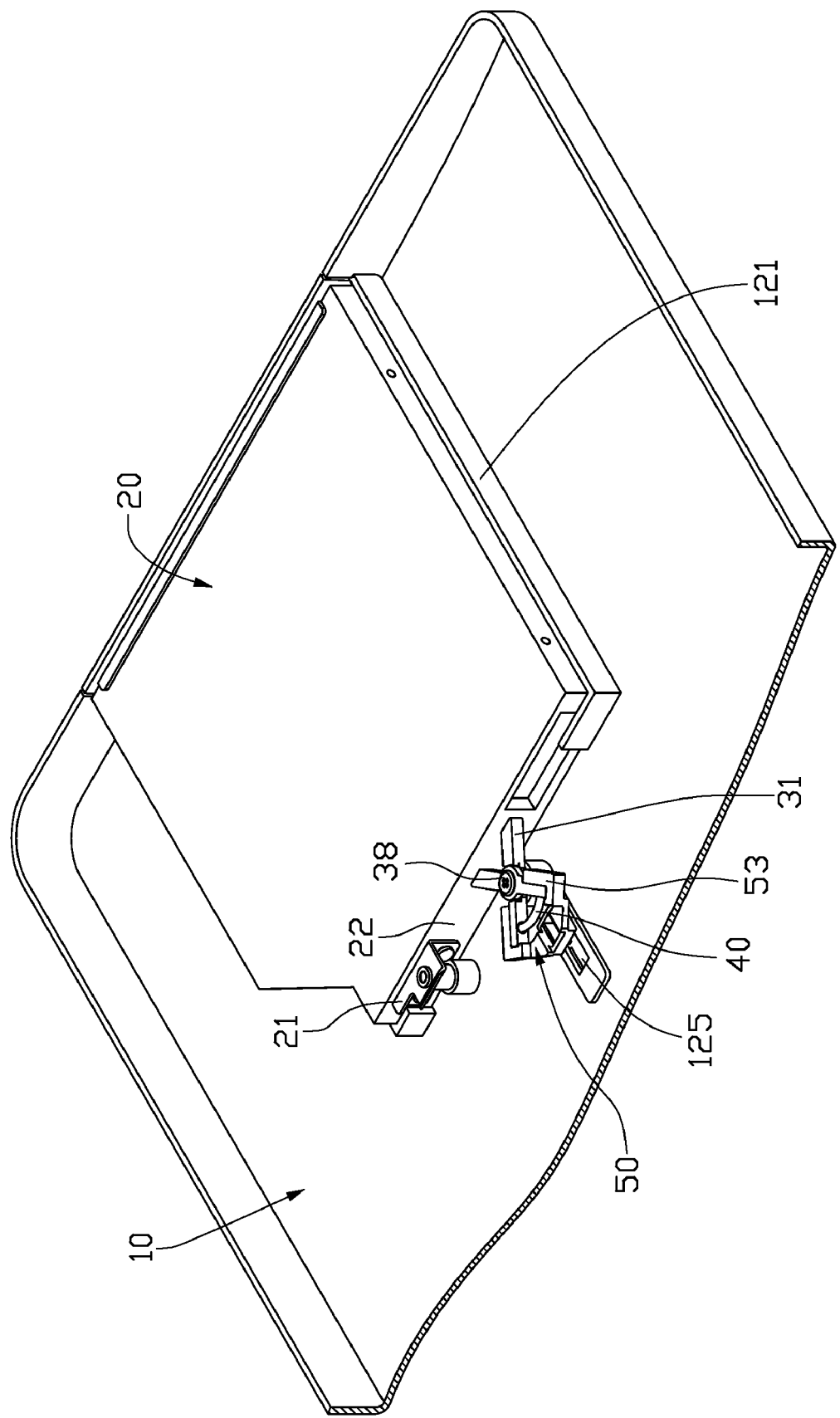
FIGS. 4 and 5 are assembled views of FIG. 1, showing the data storage device in a received state and an ejected state respectively.
Figure 5:
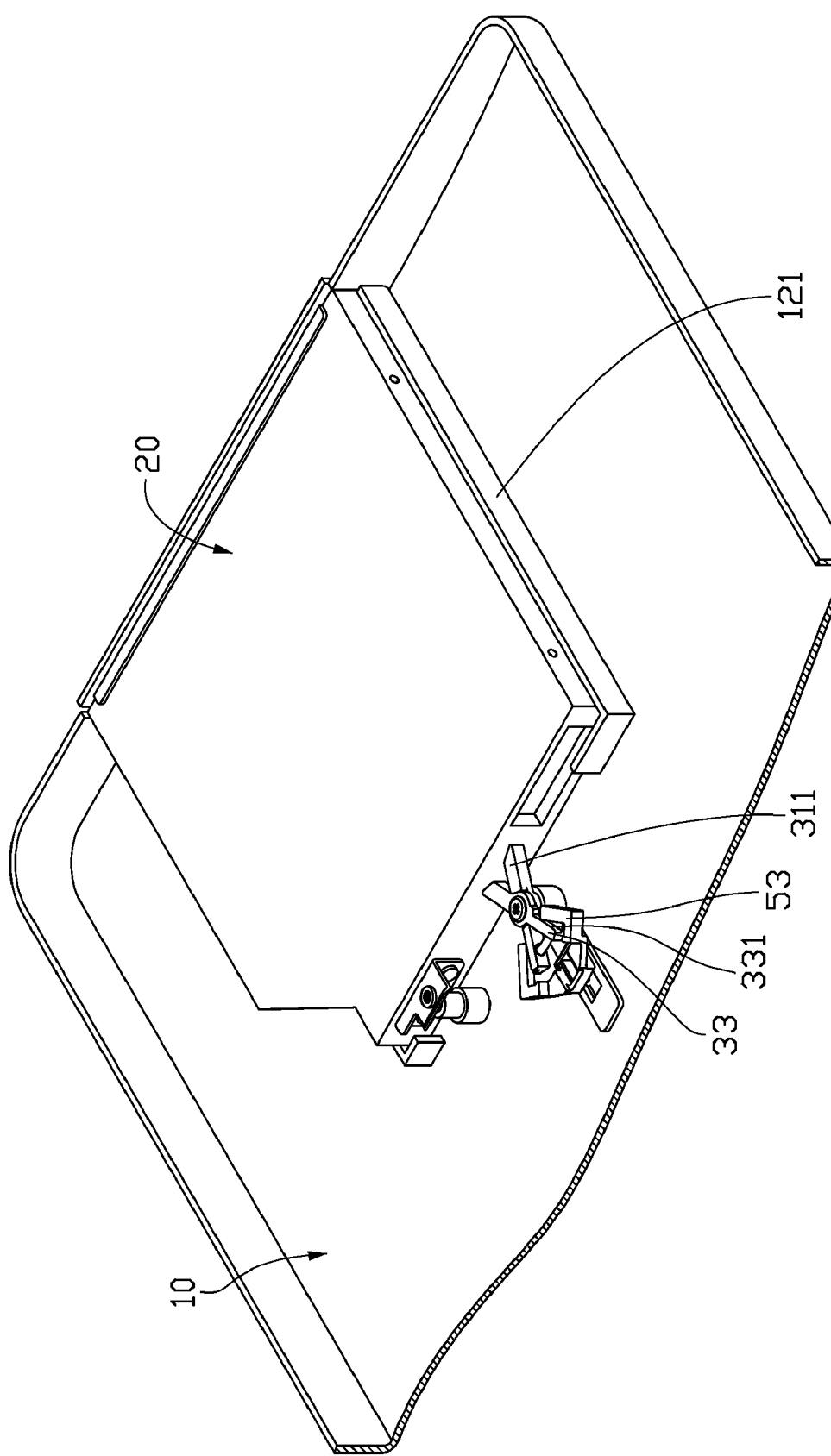
Figure 6:
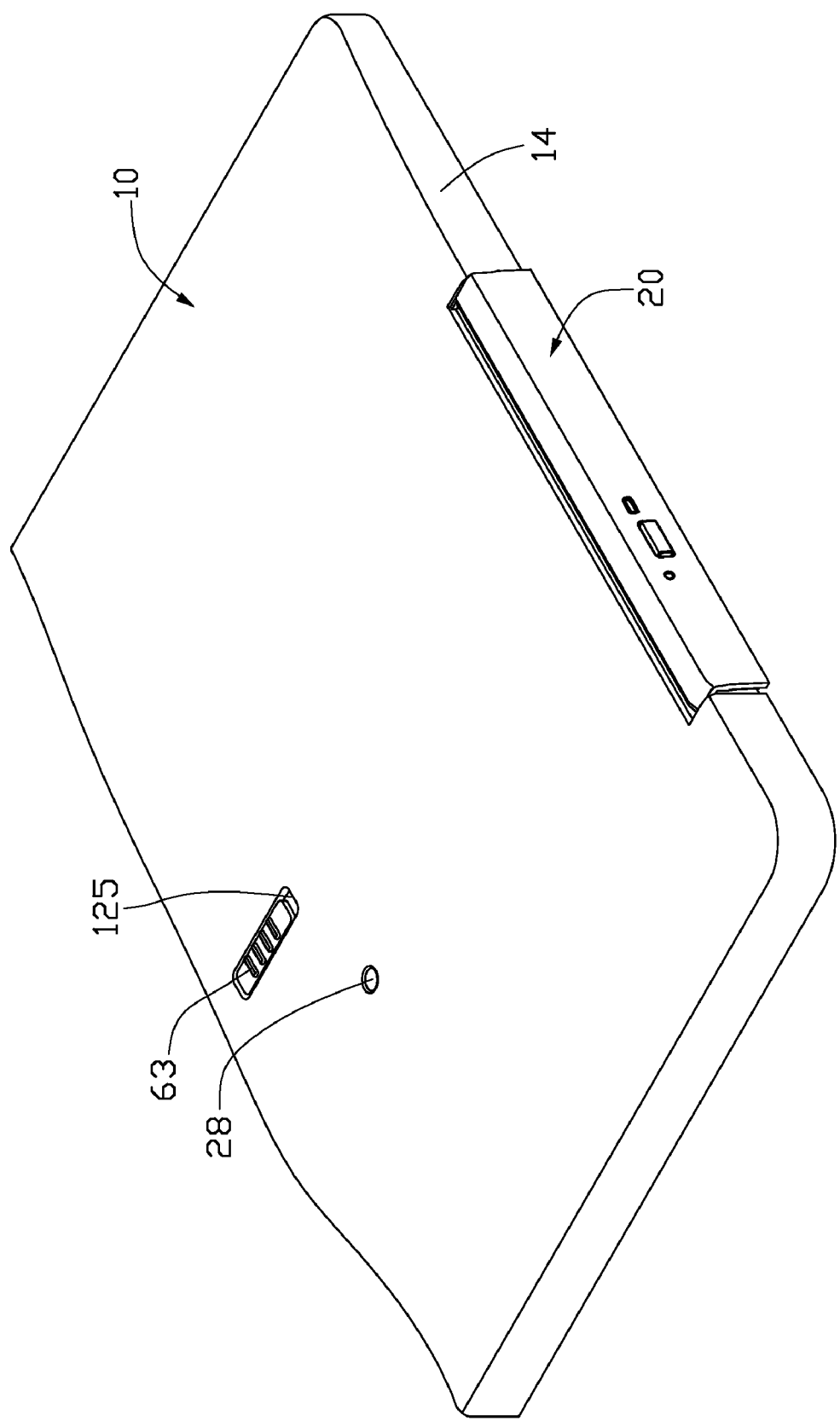
FIG. 6 is an assembled inverted view of FIG. 1.

Referring also to FIGS. 4 to 6, in assembling the ejection apparatus of the first preferred embodiment, the connecting member 50 is placed on an inside surface of the bottom panel 12 of the chassis 10, with the slot 511 of the connecting member 50 aligning with the channel 125 of the chassis 10. The operating member 60 is slidably attached to an outer surface of the bottom panel 12 of the chassis 10, with the hooks 61 extending through the channel 125 and the slot 511 to engage with the frame 51. The driving members 30 are pivotably attached together to the bottom panel 12 of the chassis 10. The first steps 332 of the driving members slidably engage with the second steps 532 of the connecting member 50, with the first walls 531 of the connecting member 50 slidably abutting the first walls 331 of the driving members 30 and the second walls 533 sliding on the second walls 333 of the driving members 30. The center holes 351 of the driving members 30 align with the threaded hole of the second protruding seat 16 of the chassis 10. The screw 38 extends through the center holes 351 of the driving members 30 and engages in the threaded hole of the second protruding seat 16. Opposite ends of the resilient member 40, are engaged in the apertures 335 of the driving members 30, respectively. Thus, the ejection apparatus is attached to the chassis 10.

The data storage device 20 is pushed into the chassis 10 from the opening 141, sliding along the rails 121. When the data storage device 20 reaches a predetermined position in the chassis 10, the screw 28 is extended through the threaded hole 211 of the first protruding seat 123 and engaged in the threaded hole 211 of the fixing plate 21 of the data storage device 20. The driving portions 311 of the driving members 30 abut against the rear wall 22 of the storage device 20.

To detach the data storage device 20 from the chassis 10, the screw 28 is unscrewed from the fixing plate 21 of the data storage device 20. The manipulating portion 63 of the operating member 60 is pushed away from the side panel 14 of the chassis 10, with the hooks 61 of the operating member 60 sliding in the channel 125 of the chassis 10. The connecting member 50 accordingly moves away from the side panel 14. The second steps 532 of the connecting member 50 slidably engage with the first steps 332 of the driving members 30 urging a scissoring movement of the driving members 30. The resilient element 40 is compressed. The driving portions 311 of the driving members 30 accordingly move together to abut against the rear wall 22 of the data storage device 20 so that the data storage device 20 slidably moves toward the side panel 14 of the chassis 10. Therefore, the data storage device 20 is pushed out a certain distance to facilitate removal from the chassis 10. When the external force exerted on the manipulating portion 63 of the operating member 60 is released, the operating member 60 slides back and the driving members 30 rotate to their original positions via the restoring force of the resilient element 40.

The arm 31 of one of the driving members 30 can be shorter than the arm 31 of the other of the driving members 30, that is, only one driving member 30 includes a driving portion to abut against the rear wall 22 of the data storage device 20.

Figure 7:
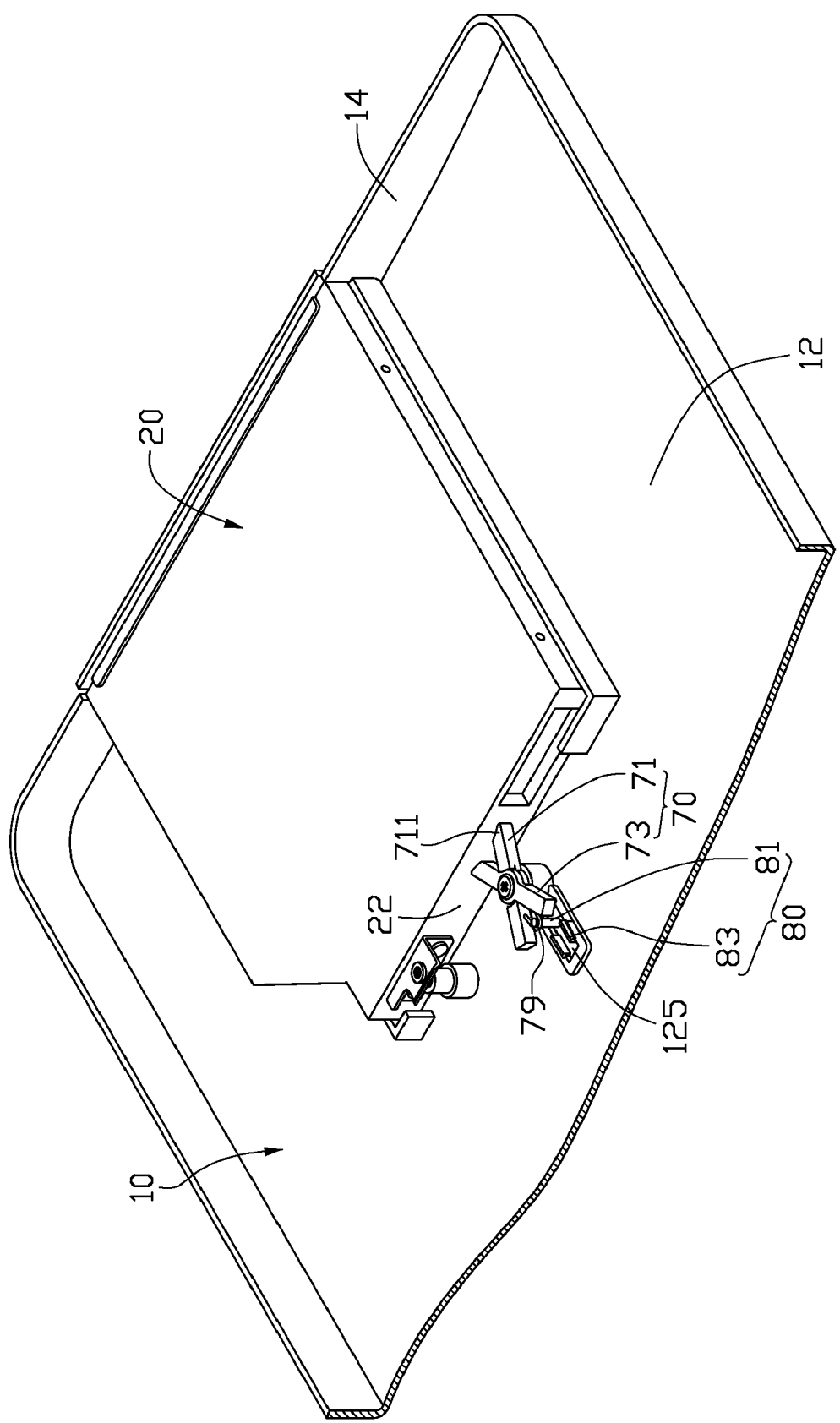
FIG. 7 is an assembled view of an ejection apparatus in accordance with a second preferred embodiment of the present invention, with a data storage device, a fixing apparatus, and a chassis.

Referring also to FIG. 7, an ejection apparatus in accordance with a second preferred embodiment of the present invention includes a pair of driving members 70, and an operating member 80. The driving members 70 are pivotably crossed together and attached to the bottom panel 12 of the chassis 10 in a same manner as the first preferred embodiment. Each of the driving members 70 includes a pair of aligned arms 71, 73 extending out from a center thereof. Each of the arms 71 includes a driving portion 711 with a slanting wall formed at a free end thereof. A flexible member 79 is disposed between the arms 71 and 73 of the driving members 70. The operating member 80 includes a pair of hooks 83 slidably engaging with the channel 125 of the bottom panel 12, and a pole 81 extending therefrom to engage with the flexible member 79. To push the data storage device 20, the operating member 80 is moved away from the side panel 14, with the hooks 83 sliding along edges of the channel 125 of the bottom panel 12 urging a scissoring movement of the driving members 70, with the pole 81 drawing the flexible member 79 away from the side panel 14. The flexible member 79 is stretched. The driving portions 711 of the driving members 70 accordingly rotate toward each other and movably abut against the rear wall 22 of the data storage device 20 so that the data storage device 20 slidably moves toward the side panel 14 of the chassis 10. Therefore, the data storage device 20 is pushed out a certain distance to facilitate removal from the chassis 10.

Figure 8:
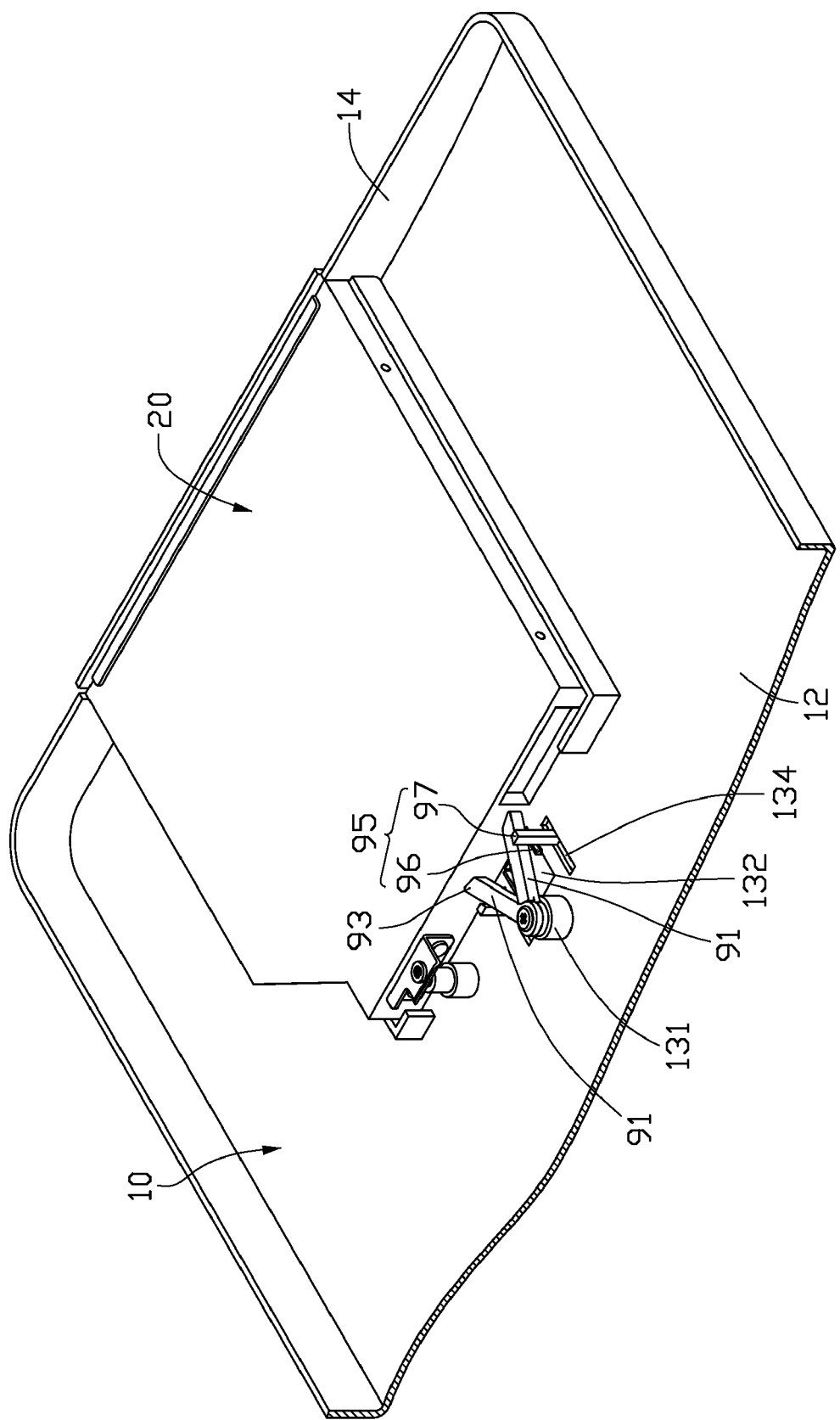
FIG. 8 is an assembled view of an ejection apparatus in accordance with a third preferred embodiment of the present invention, with a data storage device, a fixing apparatus, and a chassis.

Referring also to FIG. 8, an ejection apparatus in accordance with a third preferred embodiment of the present invention includes a pair driving members 91, and an operating member 95. The bottom panel 12 includes a protruding seat 131, a first channel 132, and a pair of second channels 134 located beside the first channel 132 respectively. The first channel 132 and the second channels 134 are arranged beside the protruding seat 131 and near the side panel 14. The driving members 91 are pivotably crossed together and attached to the protruding seat 131 of the bottom panel 12 of the chassis 10 and each include a driving portion 93 with a slanting wall formed at a free end thereof. The operating member 95 includes a pair of hooks 96 slidably engaging with the first channel 132 of the bottom panel 12, and a pair of posts 97 sliding in the second channel 134 of the bottom panel 12. To push the data storage device 20, the operation member 95 is moved toward the side panel 14, with the hooks 96 sliding along edges of the first channel 132 and the posts 97 sliding in the second channels 134 of the bottom panel 12. The posts 97 slidably engage sidewalls of the driving members 91 to urge a scissoring movement of the driving members 91. The driving portions 93 of the driving members 91 accordingly rotate toward each other and movably abut against the rear wall 22 of the data storage device 20 so that the data storage device 20 slidably moves toward the side panel 14 of the chassis 10. Therefore, the data storage device 20 is pulled out a certain distance to facilitate being taken out from the chassis 10.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

We claim:

1. An ejection apparatus for ejecting a data storage device out of a computer chassis, the ejection apparatus comprising:
   a pair of driving members pivotably crossed together and attached to the computer chassis, at least one driving member comprising a driving portion formed at one end thereof, wherein the driving portion comprises a slanting wall to abut against the data storage device; and an operating member slidably attached to the computer chassis to draw the driving members to rotate toward each other, said at least one driving portion ejecting the data storage device along a sliding direction of the operating member.

2. The ejection apparatus as claimed in claim 1, further comprising a connecting member, wherein the connecting member is slidably attached to the chassis together with and opposite to the operating member.

3. The ejection apparatus as claimed in claim 2, wherein each of the driving members comprises a first step formed at the other end thereof the connecting member comprises a bracket, the bracket comprises a pair of angular jaws, each of the jaws comprises a second step slidably engaging with the corresponding first step.

4. The ejection apparatus as claimed in claim 3, wherein each of the first and second steps comprises a first wall, and a second wall perpendicular to the first wall.

5. The ejection apparatus as claimed in claim 3, wherein the connecting member further comprises a frame crossed over a corner of the bracket, a slot is defined in the frame extending through the bracket, the operating member comprises a pair of hooks slidably extending through the slot to engage with the frame.

6. The ejection apparatus as claimed in claim 2, further comprising a flexible member disposed between the other ends of the driving members, wherein the operating member comprises a pole extending therefrom for engaging with the flexible member, and a pair of hooks extending therefrom to slidably move on the chassis.

7. The ejection apparatus as claimed in claim 2, wherein the operating member comprises a pair of hooks slidably engaging with the chassis, and a pair of posts extending therefrom slidably engaging with the driving members.

8. The ejection apparatus as claimed in claim 1, further comprising a resilient member disposed between another ends of the driving members, wherein the resilient member is a metal strip.

9. A computer enclosure comprising:
a data storage device comprising a fixing plate attached to a rear wall thereof;
a chassis holding the data storage device therein and comprising a bottom panel, and a side panel defining an opening therein;
an ejection apparatus comprising a pair of driving members pivotably crossed and attached to the bottom panel, and an ejection member slidably attached to the bottom panel, at least one driving member comprising a driving portion formed in one end thereof, the ejection member slidably moving the driving member to rotate, said at least one driving end pushing the data storage device toward the opening of the chassis; and
a fastener securing the fixing plate to the bottom panel of the chassis.

10. The computer enclosure as claimed in claim 9, wherein said at least one driving portion comprises a slanting wall to abut against the data storage device.

11. The computer enclosure as claimed in claim 10, further comprising a resilient member disposed between another ends of the driving members, wherein the resilient member is a metal strip.

12. The computer enclosure as claimed in claim 10, further comprising a connecting member, wherein the bottom panel comprises a channel defined therein, the connecting member comprises a bracket, and a frame crossing over a corner of the bracket, a slot is defined in the frame extending through the bracket, an operating member comprises a pair of hooks slidably extending through the slot to engage with the frame.

13. The computer enclosure as claimed in claim 12, wherein each of the driving members comprises a first step formed at another end thereof, the bracket comprises a pair of angular jaws, each of the jaws comprises a second step slidably engaging with the corresponding first step.

14. The computer enclosure as claimed in claim 10, further comprising a flexible member disposed between the other ends of the driving members, wherein the bottom panel of the chassis defines a channel therein, an operating member comprises a pole extending therefrom for engaging with the flexible member, and a pair of hooks extending therefrom for slidably engaging with the channel.

15. The computer enclosure as claimed in claim 10, wherein the bottom panel comprises a first channel, and a pair of second channels defined beside the first channel, an operating member comprises a pair of hooks slidably engaging with the first channel, and a pair of posts slidably received in the second channels respectively and slidably engaging with the driving members.

16. An electronic device comprising:
a chassis of said electronic device enclosing said electronic device, a side panel of said chassis defining an opening therein for access into said chassis, and a space defined in said chassis spatially communicable with said opening;
an electronic component of said electronic device removably installable in said space of said chassis for functional extension of said electronic device by means of moving through said opening along a preset plane defined perpendicular to said side panel;
an ejection apparatus installable in said chassis beside said space, said ejection apparatus comprising at least one driving member pivotally movable along said preset plane to urge movement of said electronic component out of said space through said opening when said electronic component is entirely installed in said space;
wherein said at least one driving member comprises a pair of driving members pivotally movable along and relative to said preset plane, and said pair of driving members is urged to perform a scissoring movement under control of an operating member.

* * * * *